United States Patent
Araki et al.

(10) Patent No.: US 12,092,046 B2
(45) Date of Patent: Sep. 17, 2024

(54) ENGINE SYSTEM

(71) Applicant: TOYOTA JIDOSHA KABUSHIKI KAISHA, Toyota (JP)

(72) Inventors: Susumu Araki, Toyota (JP); Takayuki Omachi, Nisshin (JP); Yuki Nose, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/484,104

(22) Filed: Oct. 10, 2023

(65) Prior Publication Data

US 2024/0191666 A1 Jun. 13, 2024

(30) Foreign Application Priority Data

Dec. 9, 2022 (JP) .................. 2022-197103

(51) Int. Cl.
| | |
|---|---|
| F02D 41/00 | (2006.01) |
| B60W 10/06 | (2006.01) |
| B60W 10/08 | (2006.01) |
| B60W 20/15 | (2016.01) |
| F02D 41/40 | (2006.01) |

(52) U.S. Cl.
CPC ......... *F02D 41/0087* (2013.01); *B60W 10/06* (2013.01); *B60W 10/08* (2013.01); *B60W 20/15* (2016.01); *F02D 41/401* (2013.01)

(58) Field of Classification Search
CPC .. F02D 41/0087; F02D 41/401; B60W 10/06; B60W 10/08; B60W 20/15
See application file for complete search history.

(56) References Cited

U.S. PATENT DOCUMENTS

| | | | | |
|---|---|---|---|---|
| 4,007,590 A | * | 2/1977 | Nagai | .................. F02D 41/025 60/284 |
| 5,845,492 A | * | 12/1998 | Isobe | ....................... F01N 3/32 60/284 |
| 6,209,516 B1 | * | 4/2001 | Yamashita | .......... F02D 41/3035 123/305 |

(Continued)

FOREIGN PATENT DOCUMENTS

| | | |
|---|---|---|
| JP | 2010-236398 A | 10/2010 |
| JP | 2021-167585 A | 10/2021 |

*Primary Examiner* — Carl C Staubach
(74) *Attorney, Agent, or Firm* — Finnegan, Henderson, Farabow, Garrett, and Dunner, LLP

(57) ABSTRACT

An engine system includes an engine including first and second cylinders, a catalyst provided in an exhaust passage of the engine, and a control device for the engine. The control device includes a fuel cut control unit configured to execute a specific cylinder fuel cut process of stopping supply of fuel to the first cylinder and supplying fuel to the second cylinder when there is a request to warm up the catalyst, an injection amount control unit configured to increase a fuel injection amount in the second cylinder at a predetermined increase rate during execution of the specific cylinder fuel cut process, as compared to a case where the specific cylinder fuel cut process is stopped, and an injection timing control unit configured to advance a fuel injection timing in a compression stroke of the second cylinder during execution of the specific cylinder fuel cut process is stopped.

3 Claims, 3 Drawing Sheets

(56) References Cited

U.S. PATENT DOCUMENTS

| | | | | |
|---|---|---|---|---|
| 8,627,789 | B2* | 1/2014 | Hiraya | F02D 41/047 |
| | | | | 123/48 B |
| 9,371,791 | B2* | 6/2016 | Yamana | F02D 41/0087 |
| 9,482,165 | B2* | 11/2016 | Stockner | F02D 41/0025 |
| 11,313,311 | B2* | 4/2022 | Ohura | F02D 41/3041 |
| 11,313,315 | B2* | 4/2022 | Hata | F02D 41/401 |
| 2007/0080005 | A1* | 4/2007 | Joe | B60W 20/40 |
| | | | | 180/65.245 |
| 2018/0306106 | A1* | 10/2018 | Glugla | F02D 15/02 |
| 2018/0306131 | A1* | 10/2018 | Tsuda | F02D 41/0042 |
| 2021/0107448 | A1* | 4/2021 | Nose | B60W 20/10 |
| 2021/0316714 | A1* | 10/2021 | Nose | B60W 10/08 |
| 2022/0120230 | A1* | 4/2022 | Wilcutts | F02D 41/0245 |

* cited by examiner

ENGINE SYSTEM

CROSS-REFERENCE TO RELATED APPLICATION

This application is based upon and claims the benefit of priority of the prior Japanese Patent Application No. 2022-197103, filed on Dec. 9, 2022, the entire contents of which are incorporated herein by reference.

TECHNICAL FIELD

The present disclosure relates to an engine system.

BACKGROUND

Fuel cut is executed in a specific cylinder among cylinders of an engine, and fuel injection amount is increased in the other cylinders. As a result, a catalyst is warmed up (see, for example, Japanese Unexamined Patent Application Publication No. 2021-167585).

A combustion state might deteriorate in the cylinder in which the fuel injection amount is increased, and an operation state of the engine might become unstable.

SUMMARY

It is therefore an object of the present disclosure to provide an engine system capable of warming up a catalyst and suppressing deterioration of an operation state of an engine.

The above object is achieved by an engine system including: an engine including first and second cylinders; a catalyst provided in an exhaust passage of the engine; and a control device for the engine, wherein the control device includes: a fuel cut control unit configured to execute a specific cylinder fuel cut process of stopping supply of fuel to the first cylinder and supplying fuel to the second cylinder when there is a request to warm up the catalyst; an injection amount control unit configured to increase a fuel injection amount in the second cylinder at a predetermined increase rate during execution of the specific cylinder fuel cut process, as compared to a case where the specific cylinder fuel cut process is stopped; and an injection timing control unit configured to advance a fuel injection timing in a compression stroke of the second cylinder during execution of the specific cylinder fuel cut process, as compared to a case where the specific cylinder fuel cut process is stopped.

The control device may include an injection ratio control unit configured to control an intake stroke injection rate in the second cylinder and a compression stroke injection rate in the second cylinder, and when a fluctuation amount per unit time of at least one of rotational speed and torque of the engine during execution of the specific cylinder fuel cut process is greater than a threshold value, the injection ratio control unit may be configured to increase the intake stroke injection rate and decreases the compression stroke injection rate, as compared to when the fluctuation amount during execution of the specific cylinder fuel cut process is equal to or smaller than the threshold value.

When the predetermined increase rate is greater than a threshold value, the injection timing control unit may be configured to advance the fuel injection timing, as compared to when the predetermined increase rate is equal to or smaller than the threshold value.

The above configuration may include a motor configured to assist torque of the engine during execution of the specific cylinder fuel cut process.

DETAILED DESCRIPTION

Schematic Configuration of Engine System

Figure 1:
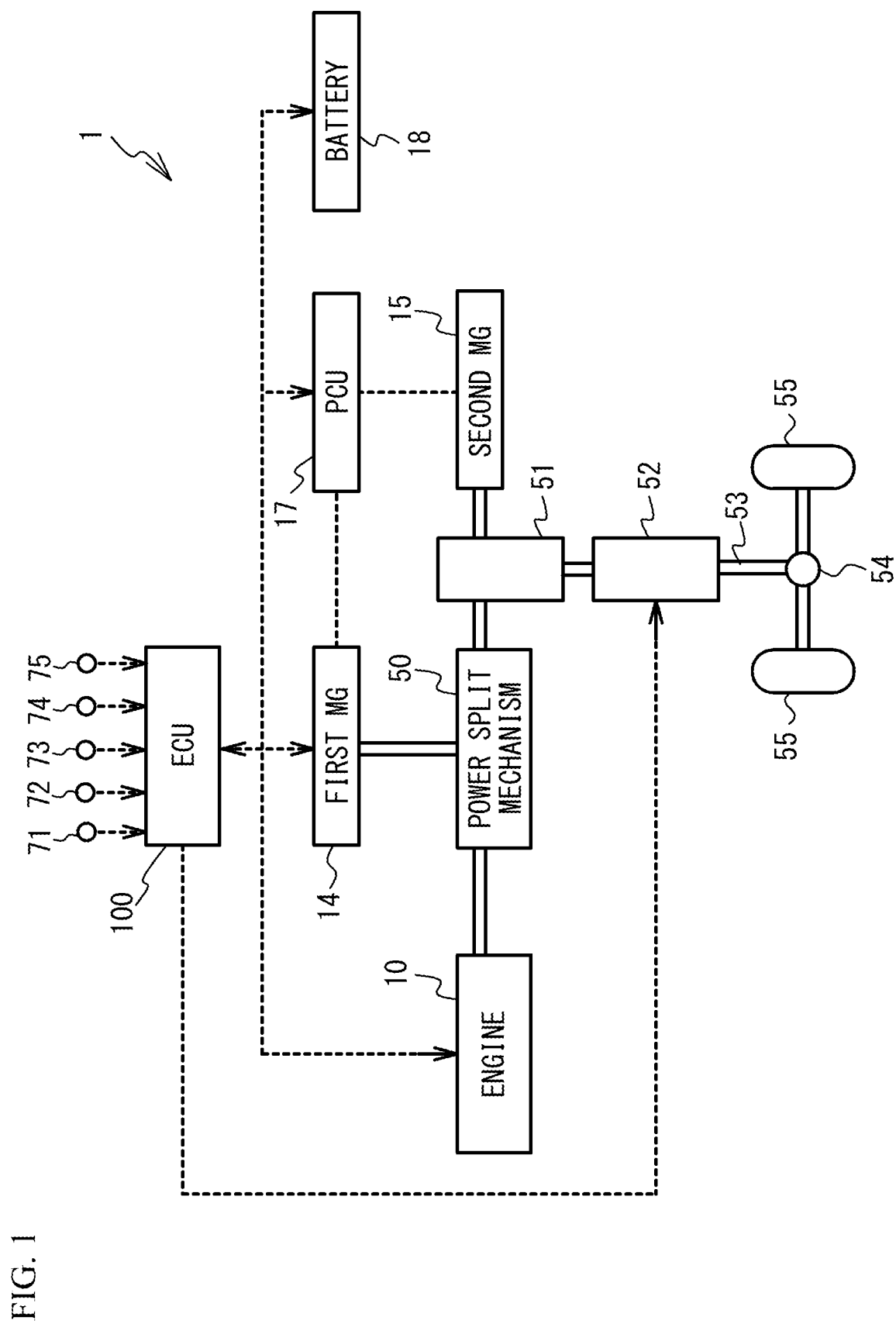
FIG. 1 is a schematic configuration view of an engine system.

FIG. 1 is a schematic configuration view of an engine system 1 according to the present embodiment. In the present embodiment, the engine system 1 is mounted on a hybrid vehicle. The engine system 1 includes an Electronic Control Unit (ECU) 100, an engine 10, a first motor generator (hereinafter referred to as "first MG") 14, a second motor generator (hereinafter referred to as "second MG") 15, a Power Control Unit (PCU) 17, a battery 18, a power split mechanism 50, a transmitting mechanism 51, a transmission 52, a drive shaft 53, a differential gear 54, and drive wheels 55. The engine 10 has four cylinders #1 to #4 in the present embodiment. The number of cylinders is not limited to four as long as the engine 10 has a plurality of cylinders. The engine 10 is a gasoline engine, but is not limited to this and may be a diesel engine. The engine 10, the first MG 14, and the second MG 15 are power sources for traveling of the engine system 1.

The first MG 14 and the second MG 15 have a function as a motor that outputs torque by power supply. Also, the first MG 14 and the second MG 15 have a function as power generators that generate regenerative power when torque is applied thereto. The first MG 14 and the second MG 15 are electrically connected to the battery 18 via the PCU 17. The PCU 17 supplies power from the battery 18 to the first MG 14 or the second MG 15. The PCU 17 causes the battery 18 to receive regenerative electric power generated in the first MG 14 or the second MG 15.

The power split mechanism 50 mechanically couples a crankshaft of the engine 10, a rotational shaft of the first MG 14, and the power split mechanism 50. An output shaft of the power split mechanism 50 is coupled to the transmitting mechanism 51. A rotational shaft of the second MG 15 is coupled to the transmitting mechanism 51. The transmitting mechanism 51 is coupled to the transmission 52. The transmission 52 is coupled to the drive shaft 53. The driving forces of the engine 10, the first MG 14, and the second MG 15 are transmitted to the drive wheels 55 via the transmitting mechanism 51, the transmission 52, the drive shaft 53, and the differential gear 54.

The transmission 52 is a stepped automatic shifting device provided between the second MG 15 and the drive shaft 53. The transmission 52 changes the gear ratio by controlling the ECU 100.

The ECU 100 is an electronic control unit that includes an arithmetic process circuit that executes various types of an arithmetic process related to travel control of the vehicles and a memory that stores control programs and date. The ECU 100 is an example of a control device. The ECU 100 functionally achieves a fuel cut control unit, an injection amount control unit, an injection timing control unit, and an injection ratio control unit, which will be described later.

Signals from an ignition switch 71, a water temperature sensor 72, a crank angle sensor 73, an air flow meter 74, and an accelerator opening degree sensor 75 are input to the ECU 100. The ignition switch 71 detects the ON/OFF state of the ignition. The water temperature sensor 72 detects a temperature of a coolant of the engine 10. The crank angle sensor 73 detects an engine rotational speed that is a rotational speed of the crankshaft of the engine 10. The air flow meter 74 detects an amount of intake air introduced into the engine 10. The accelerator opening degree sensor 75 detects an operation position of an accelerator pedal.

Schematic Configuration of Engine

Figure 2:
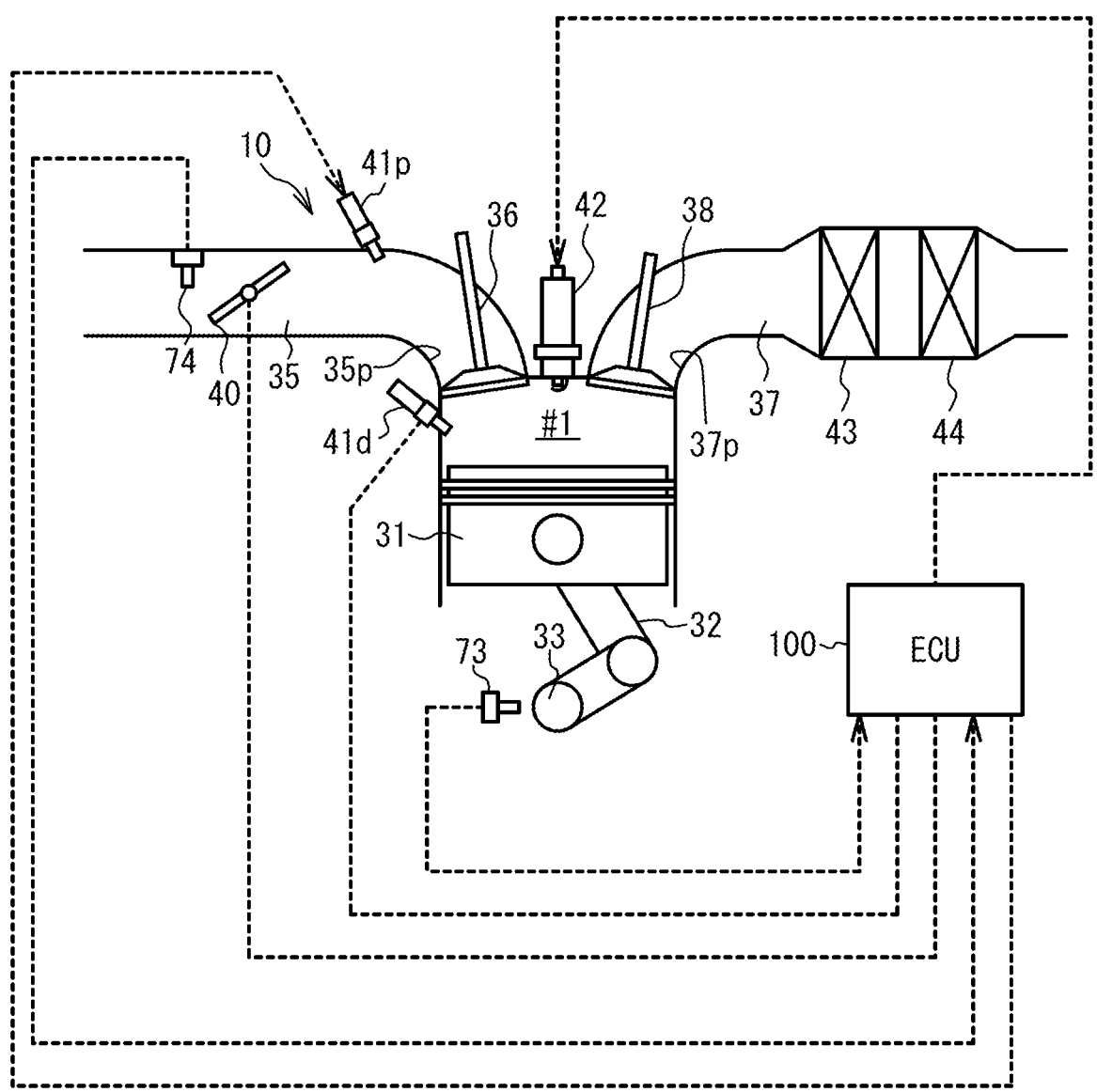
FIG. 2 is a schematic configuration view of an engine.

FIG. 2 is a schematic configuration view of the engine 10. The engine 10 includes a cylinder #1, a piston 31, a connecting rod 32, a crankshaft 33, an intake passage 35, an intake valve 36, an exhaust passage 37, and an exhaust valve 38. FIG. 2 illustrates cylinder #1 among the four cylinders #1 to #4 included in the engine 10. Since the cylinders #1 to #4 have the same configuration, the cylinder #1 will be described below. In the cylinder #1, the air-fuel mixture is burned. The piston 31 is accommodated in the cylinder #1 so as to be capable of reciprocating. The piston 31 is coupled to the crankshaft 33, which is an output shaft of the engine 10, via the connecting rod 32. The connecting rod 32 and the crankshaft 33 convert the reciprocating motion of the piston 31 into rotational motion of the crankshaft 33.

The cylinder #1 is provided with an in-cylinder injector 41d. The in-cylinder injector 41d directly injects fuel into the cylinder #1. The intake passage 35 is provided with a port injector 41p that injects fuel toward an intake port 35p. The cylinder #1 is provided with an ignition device 42. The ignition device 42 ignites a mixture of the intake air introduced through the intake passage 35 and the fuel injected by the in-cylinder injector 41d and the port injector 41p, by spark discharge. Note that at least one of the in-cylinder injector 41d and the port injector 41p may be provided.

The intake passage 35 is connected to the intake ports 35p of the cylinder #1 through the intake valve 36. The exhaust passage 37 is connected to an exhaust port 37p of the first cylinder via the exhaust valve 38. The air flow meter 74 described above and a throttle valve 40 that controls the intake air amount are provided in the intake passage 35.

A catalyst 43 and a Gasoline Particulate Filter (GPF) 44 are provided in the exhaust passage 37 from the upstream side. The catalyst 43 contains, for example, a catalytic metal such as platinum (Pt), palladium (Pd), or rhodium (Rh), has oxygen storage capacity, and purifies NOx, HC, and CO. The GPF44 is a porous-ceramic structure and collects exhaust particulates (hereinafter referred to as PM (Particulate Matter)) in exhaust gas.

The throttle valve 40 increases or decreases the amount of intake air introduced into the cylinder #1 by increasing or decreasing an opening degree of the throttle valve 40. The opening degree of the throttle valve 40 is controlled in accordance with a required opening degree from the ECU 100.

Catalyst Warm-up Control

Figure 3:
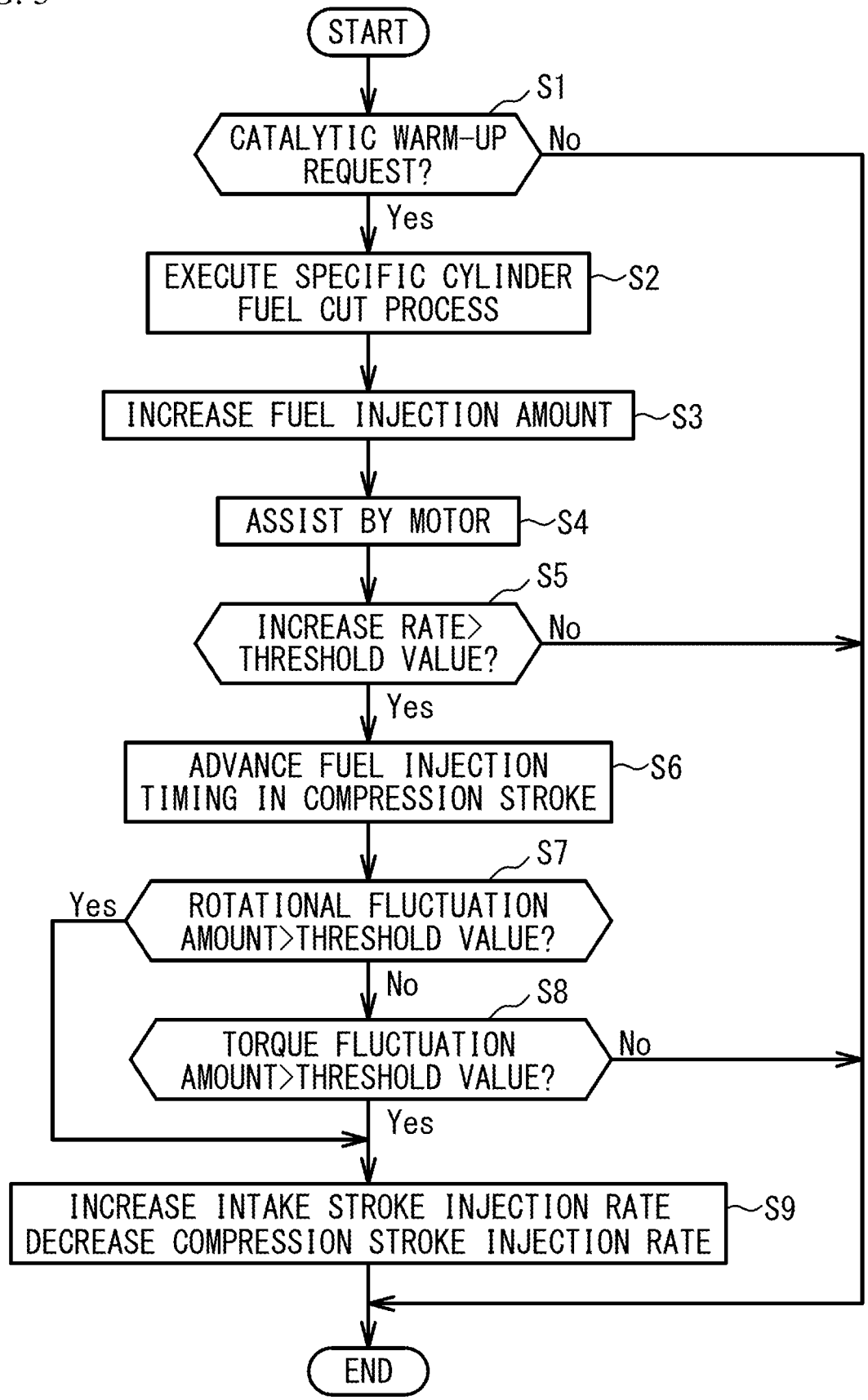
FIG. 3 is a flowchart illustrating an example of catalyst warm-up control executed by an ECU.

FIG. 3 is a flowchart illustrating an example of catalytic warm-up control executed by the ECU 100. This control is repeatedly executed at predetermined intervals in a state where the ignition is on. The ECU 100 determines whether or not there is a catalytic warm-up request (step S1). In a case of No in step S1, this control ends.

In a case of Yes in step S1, the ECU 100 executes a specific cylinder fuel cut process (step S2). The specific cylinder fuel cut process is a process of stopping the supply of fuel to any one of the cylinders #1 to #4 and supplying fuel to the other cylinders. In the present embodiment, the supply of fuel to the cylinder #1 is stopped, and fuel is supplied to the cylinders #2 to #4. In the present embodiment, split injection is executed by the in-cylinder injector 41d in each of the cylinders #2 to #4. Specifically, fuel is injected in each of the intake stroke and the compression stroke. During execution of the specific cylinder fuel cut process, feedback control for controlling the fuel injection amount and the intake air amount based on the air-fuel ratio of the exhaust gas is stopped. Step S2 is an example of a process executed by the fuel cut control unit. The cylinder #1 is an example of a first cylinder. The cylinder #2 is an example of a second cylinder.

The ECU 100 increases the fuel injection amount in each of the cylinders #2 to #4 other than the cylinder #1 not targeted for fuel cut, as compared with the case where the specific cylinder fuel cut process is not executed (step S3). Thus, it is possible to suppress a decrease in the torque of the engine 10 caused by the stop of the fuel supply to the cylinder #1. In addition, the warm-up of the catalyst 43 is completed early by increasing the fuel injection amount.

The upper limit value of the increase rate of the fuel injection amount is expressed by (total number of cylinders/number of injection cylinders) [%]. The number of injection cylinders is the number of cylinders not targeted for fuel cut. In the present embodiment, the increase rate of each fuel injection amount of the cylinders #2 to #4 is about 133 [%] at the maximum. By setting the upper limit value of the increase rate in this way, the total fuel injection amount at the time of execution of the specific cylinder fuel cut process can be suppressed to be equal to or smaller than the total fuel injection amount at the time of stop of the specific cylinder fuel cut process. Thus, it is possible to suppress deterioration of emission while suppressing deterioration of fuel economy. The increase rate may be a variable value according to the rotational speed of the engine 10 or the intake air amount, or may be a fixed value. In the present embodiment, the increase rate is described as a variable value. Step S3 is an example of a process executed by the injection amount control unit.

Next, the ECU 100 assists the torque of the engine 10 associated with the execution of the specific cylinder fuel cut process by the first MG 14 (step S4). The torque of the engine 10 temporarily decreases in a period corresponding to the explosion stroke of the cylinder in which the fuel cut is executed. The torque of the first MG 14 is controlled so as to compensate for such a decrease in the torque of the engine 10. For example, the ECU 100 recognizes the explosion stroke of the cylinders in which the fuel cut is executed based on the detection value of the crank angle sensor 73. The ECU 100 controls the first MG 14 such that the torque of the PCU 17 temporarily increases during this explosion stroke. Thus, drivability is ensured.

The ECU 100 determines whether or not the increase rate of the fuel injection amount is larger than a threshold value (step S5). The threshold value is set to an upper limit value of the increase rate at which the time for forming the air-fuel mixture is secured and the combustion state is not affected. If the increase rate is greater than the threshold value, the injection period might be prolonged and the combustion state might be deteriorated. The threshold value is determined in advance based on experimental results or simulation results. In a case of No in step S5, the present control ends.

In a case of Yes in step S5, the ECU 100 advances the start timing of fuel injection in the compression stroke by a predetermined advance amount (step S6). Thus, the formation time of the air-fuel mixture is ensured, and the combustion state is stabilized. Step S6 is an example of a process executed by the injection timing control unit.

Next, the ECU 100 determines whether or not a fluctuation amount of the rotational speed of the engine 10 per unit time is larger than a threshold value (step S7). The rotational speed of the engine 10 is calculated based on the detection value of the crank angle sensor 73. The threshold value in this case is set to, for example, an upper limit value of the fluctuation amount of the rotational speed of the engine 10 that does not affect drivability. When the determination result in step S7 is No, the ECU 100 determines whether or not the fluctuation amount of the torque of the engine 10 per unit time is larger than a threshold value (step S8). The threshold value in this case is also set to, for example, an upper limit value of the fluctuation amount of the torque of the engine 10 that does not affect drivability. The torque of the engine 10 may be calculated based on, for example, a current value supplied to the first MG 14 connected to the engine 10 and the rotational speed of the engine 10. The torque of the engine 10 may be calculated from various state quantities such as the rotational speed of the engine 10 and the opening degree of the throttle valve 40. In a case of No in step S8, this control ends.

In a case of Yes in step S7 or S8, the ECU 100 increases the intake stroke injection rate and decreases the compression stroke injection rate (step S9). The split injection is to inject fuel a plurality of times in one combustion cycle. In the present embodiment, fuel injection is executed in each of the first half of the intake stroke, the second half of the intake stroke, and the compression stroke. In particular, the ECU 100 increases the intake stroke injection rate and decreases the compression stroke injection rate. For example, when the ratio of each injection in the first half of the intake stroke, the second half of the intake stroke, and the compression stroke is 6:2:2, this ratio is changed to 6.5:2.5:1. As the compression stroke injection rate decreases, the degree of stratification of the air-fuel mixture decreases. This prevents the air-fuel ratio in the vicinity of the ignition device 42 from becoming excessively rich. As a result, fluctuations in the rotational speed and torque of the engine 10 are suppressed, and drivability is ensured. Step S9 is an example of a process executed by the injection ratio control unit.

Note that only one of steps S7 and S8 may be executed. The contents of the present embodiment may be applied to an engine system of an engine vehicle on which only an engine is mounted as a traveling power source.

Although some embodiments of the present disclosure have been described in detail, the present disclosure is not limited to the specific embodiments but may be varied or changed within the scope of the present disclosure as claimed.

What is claimed is:

1. An engine system comprising:
    an engine including first and second cylinders;
    a catalyst provided in an exhaust passage of the engine; and
    a control device for the engine,
    wherein
    the control device includes:
        a fuel cut control unit configured to execute a specific cylinder fuel cut process of stopping supply of fuel to the first cylinder and supplying fuel to the second cylinder when there is a request to warm up the catalyst;
        an injection amount control unit configured to increase a fuel injection amount in the second cylinder at a predetermined increase rate during execution of the specific cylinder fuel cut process, as compared to a case where the specific cylinder fuel cut process is stopped;
        an injection timing control unit configured to advance a fuel injection timing in a compression stroke of the second cylinder during execution of the specific cylinder fuel cut process, as compared to a case where the specific cylinder fuel cut process is stopped; and
        an injection ratio control unit configured to control an intake stroke injection rate in the second cylinder and a compression stroke injection rate in the second cylinder,
    wherein when a fluctuation amount per unit time of at least one of rotational speed and torque of the engine during execution of the specific cylinder fuel cut process is greater than a first threshold value, the injection ratio control unit is configured to increase the intake stroke injection rate and decrease the compression stroke injection rate, as compared to when the fluctuation amount during execution of the specific cylinder fuel cut process is equal to or smaller than the first threshold value.

2. The engine system according to claim 1, wherein when the predetermined increase rate is greater than a second threshold value, the injection timing control unit is configured to advance the fuel injection timing, as compared to when the predetermined increase rate is equal to or smaller than the second threshold value.

3. The engine system according to claim 1, further comprising a motor configured to assist torque of the engine during execution of the specific cylinder fuel cut process.

* * * * *